(12) United States Patent
Abe et al.

(10) Patent No.: US 7,784,858 B2
(45) Date of Patent: Aug. 31, 2010

(54) REAR VEHICLE BODY STRUCTURE

(75) Inventors: Yoshio Abe, Wako (JP); Yoshiyuki Toba, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/594,051

(22) PCT Filed: May 28, 2008

(86) PCT No.: PCT/JP2008/060243

§ 371 (c)(1),
(2), (4) Date: Sep. 30, 2009

(87) PCT Pub. No.: WO2009/001655

PCT Pub. Date: Dec. 31, 2008

(65) Prior Publication Data

US 2010/0072787 A1 Mar. 25, 2010

(30) Foreign Application Priority Data

Jun. 22, 2007 (JP) .............................. 2007-165124

(51) Int. Cl.
*B62D 25/20* (2006.01)

(52) U.S. Cl. ........................... 296/203.04; 296/187.11; 280/781; 280/788

(58) Field of Classification Search ............ 296/203.04, 296/187.11, 204, 205, 193.07; 280/781, 280/788
See application file for complete search history.

(56) References Cited

U.S. PATENT DOCUMENTS

| | | | |
|---|---|---|---|
| 5,085,484 A * | 2/1992 | Mori | 296/204 |
| 5,174,628 A | 12/1992 | Hayatsugu et al. | |
| 6,802,558 B2 * | 10/2004 | Matsuoka | 296/203.04 |

FOREIGN PATENT DOCUMENTS

JP 05-077764 3/1993

* cited by examiner

*Primary Examiner*—Joseph D Pape
(74) *Attorney, Agent, or Firm*—Rankin, Hill & Clark LLP

(57) ABSTRACT

Rear vehicle body structure (10) includes a sub-frame (16), which has left and right sub side members (51, 52) and front and rear sub cross members (53, 54) that together constitute a substantially rectangular framework (46). The left sub side member includes a left rear extension portion (58) extending from the framework toward the rear of the vehicle body and connected to a left rear joint section (42), where the rear cross member and the left rear side frame are joined together. The right sub side member includes a right rear extension portion (63) extending from the framework toward the rear of the vehicle body and connected to a right rear joint section (44).

4 Claims, 9 Drawing Sheets

REAR VEHICLE BODY STRUCTURE

TECHNICAL FIELD

The present invention relates to rear vehicle body structures in which a pair of cross members span between left and right rear side frames and in which a sub-frame is disposed beneath the cross members.

BACKGROUND ART

In some of the conventionally-known rear vehicle body structures, rear side frames are provided on left and read sides of a rear vehicle body section, cross members span between the left and right rear side frames and in which a sub-frame is disposed beneath the cross members and rear suspensions are provided on the sub-frame. In such rear vehicle body structures, extension members are provided on joints between the rear side frames and the cross members, and a mounting portion of the sub-frame is fastened, via the extension members, to the rear side frames and cross members by means of a plurality of bolts (for example, Japanese Patent Publication No. 2871219 B).

In the rear vehicle body structure disclosed in the No. 2871219 publication, a load applied to the rear suspensions during travel of the vehicle is transmitted to the sub-frame. The load transmitted to the sub-frame is then dispersed to and borne by the rear side frames and cross members. The mounting portion of the sub-frame is bolted, via the extension members, not only to the rear side frames but also to the cross member. Thus, if the cross members are deformed to curve, the mounting portion of the sub-frame, bolted to the cross members, may be undesirably positionally displaced in response to the deformation of the cross member.

Due to the positional displacement of the mounting portion of the sub-frame, it is difficult to secure a sufficient rigidity of the sub-frame; besides, it is difficult to efficiently disperse the load, transmitted from the rear suspensions to the sub-frame, to the rear side frames and cross member.

DISCLOSURE OF THE INVENTION

In view of the foregoing prior art problems, it is an object of the present invention to provide an improved rear vehicle body structure which can secure a sufficient rigidity of the sub-frame and efficiently disperse the load, transmitted from the rear suspensions to the sub-frame, to the rear side frames and cross members.

In order to accomplish the above-mentioned object, the present invention provides an improved rear vehicle body structure, which comprises: left and right rear side frames provided in a rear vehicle body section; front and rear cross members spanning between the left and right rear side frames with a predetermined interval between the cross members; and a sub-frame provided beneath the front and rear cross members and having rear suspensions thereon. The sub-frame includes: left and right sub side members each having a substantially U shape such that the left and right sub side members project toward each other, i.e. inwardly toward the centerline of the vehicle body; a front sub cross member spanning between respective near-front-end regions of the left and right sub side members; and a rear sub cross member spanning between respective near-rear-end regions of the left and right sub side members. The left and right sub side members and the front and rear sub cross members together constitute a framework of a substantially rectangular shape. The left sub side member of the substantially U shape includes a left rear extension portion extending from the framework toward the rear of the vehicle body, and the left rear extension portion is connected to a joint section where the rear cross member and the left rear side frame are joined together. The right sub side member of the substantially U shape includes a right rear extension portion extending from the framework toward the rear of the vehicle body, and the right rear extension portion is connected to a joint section where the rear cross member and the right rear side frame are joined together.

In forming the sub-frame into the substantially rectangular framework, it is preferable that the framework have a small size with a view to enhancing the rigidity of the framework. This is why the left and right sub side members are each formed into a generally U shape projecting toward each other, so that a distance between the left and right sub side members can be made considerably small in respective middle portions of the side members. Consequently, the framework of the sub-frame can be made compact in size and thus can have a sufficient rigidity. Further, the front sub cross member spans between the respective near-front-end regions of the left and right sub side members, and the rear sub cross member spans between the respective near-rear-end regions of the left and right sub side members.

Further, the front sub cross member spans between near-front-end regions, closer to the middle portions than the front ends, of the left and right sub side members, and the rear sub cross member spans between near-rear-end regions, closer to the middle portions than the rear ends, of the left and right sub side members. Thus, a distance between the front and rear cross members can be made considerably small. With such small distances between the left and right sub side members and between the front and rear cross members, the above-mentioned framework can be made considerably small in size.

Further, during travel of the vehicle, a load applied in the front-rear direction and width direction of the vehicle body acts on the rear suspensions. Thus, the load applied in the front-rear direction and width direction of the vehicle body acts on the sub-frame by way of the rear suspensions. Furthermore, the joint section where the rear cross member and left rear side frame are joined together can have a great rigidity.

Thus, in the present invention, the left and right side members have the left and right rear extension portions extending from the framework toward the rear of the vehicle body. Because the left and right side members each have a generally U shape, the left and right rear extension portions can extend as extensions of a diagonal line of the framework. Furthermore, in the present invention, the right rear extension portion is connected to the joint section where the rear cross member and the right rear side frame are joined together. Consequently, a load applied to the sub-frame in the front-rear direction and width direction of the vehicle body can be efficiently transmitted, via the left and right rear extension portions, to the joint section where the rear cross member and the right rear side frame are joined together. Thus, a load transmitted from the rear suspensions to the sub-frame can be efficiently dispersed to, and sufficiently absorbed by, the rear cross member and the left and right rear side frame.

The joint section where the rear cross member and left rear side frame are joined together and the joint section where the rear cross member and right rear side frame are joined together have a great rigidity. Thus, the load applied in the front-rear direction and width direction of the vehicle body and transmitted to the joint sections can be efficiently transmitted, via the joint sections, to the rear cross member and left and right rear side frames.

Namely, with the left and right rear extension portions extending as extensions of the diagonal line of the framework and connected to the joint sections, the load transmitted from the rear suspensions to the sub-frame can be efficiently dispersed to, and sufficiently absorbed by, the rear cross member and the left and right rear side frame.

BRIEF DESCRIPTION OF DRAWINGS

Certain preferred embodiments of the present invention will hereinafter be described in detail, by way of example only, with reference to the accompanying drawings, in which.

BEST MODE FOR CARRYING OUT THE INVENTION

Figure 1:
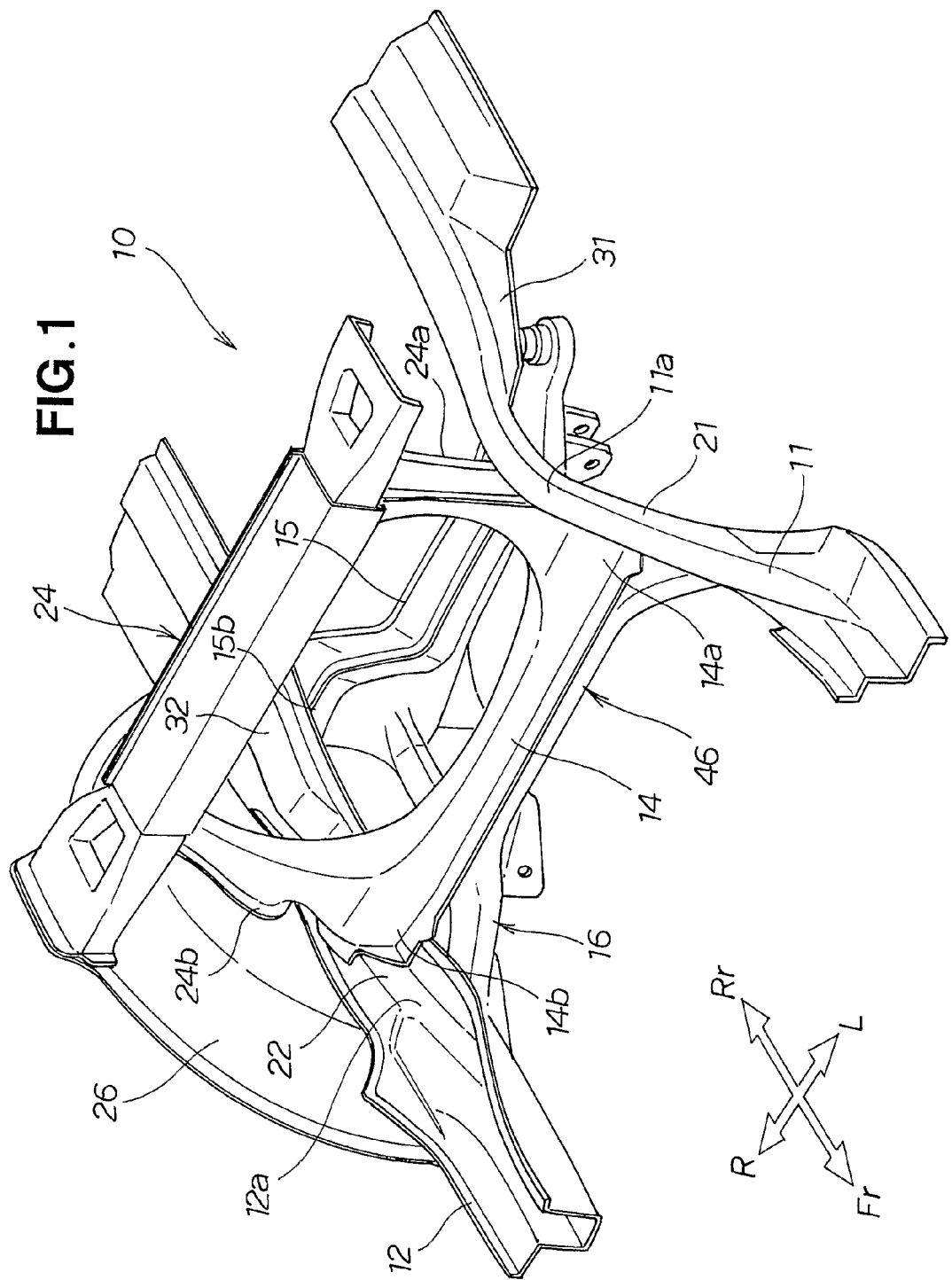
FIG. 1 is a perspective view showing a rear vehicle body structure according to an embodiment of the present invention.

In the following description, the terms "front", "rear", "left" and "right" are used to refer to directions as viewed by a human operator or driver of an automotive vehicle, and these directions are indicated in the drawings by reference characters Fr, Rr, L and R, respectively.

FIG. 1 is a perspective view showing a rear vehicle body structure according to an embodiment of the present invention. The rear vehicle body structure 10 includes: left and right rear side frames 11 and 12; front and rear cross members 14 and 15 spaced apart from each other in a front-rear direction of the vehicle and spanning between the left and right rear side frames 11 and 12; and a sub-frame 16 (see FIG. 4) beneath the front and rear cross members 14 and 15. Left and right rear suspensions 18 and 19 (see FIG. 4) are provided on the sub-frame 16.

The left rear side frame 11 is a kick-up frame having a left raised portion (i.e., left kick-up) 11a, while the right rear side frame 12 is a kick-up frame having a right raised portion (i.e., right kick-up) 12a. Details of the left and right rear side frames 11 and 12 will be discussed later.

The front cross member 14 is a substantially linear member, which has a left end portion 14a fixedly joined to a front portion 21 of the left kick-up 11a (hereinafter also referred to as "left-kick-up front portion 21") and a right end portion 14b fixedly joined to a front portion 22 of the right kick-up 12b (hereinafter "right-kick-up front portion 22").

Figure 4:
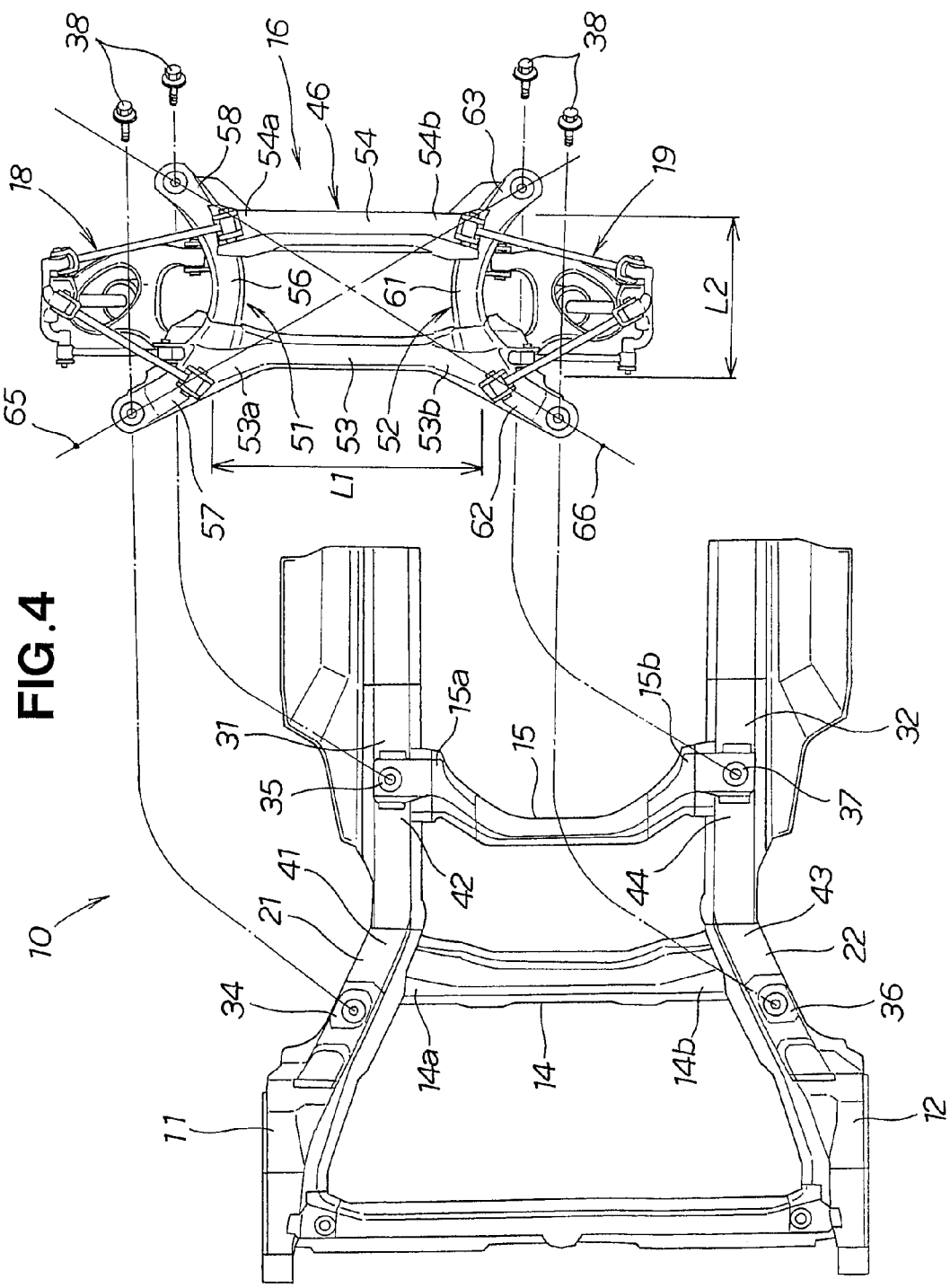
FIG. 4 is a bottom view of the rear vehicle body structure with a sub-frame detached therefrom.

The front cross member 14 is disposed in a width direction of the vehicle between the front portions 21 and 22 of the left and right kick-ups (see also FIG. 4). The rear bulkhead 24 constitutes a lower beam of a rear bulkhead 24. The front cross member 14 has a left end portion 24a located in a left wheel house 25 (see FIG. 2) and a right end portion 24b located in a right wheel house 25. Note that, in FIG. 1, only the right wheel house 26 is shown to facilitate understanding.

The rear cross member 15, which is a substantially bow-shaped member, which has a left end portion 15a fixedly joined to a rear portion 31 of the left kick-up 11a (hereinafter also referred to as "left-kick-up rear portion 31") and a right end portion 15b fixedly joined to a rear portion 32 of the right kick-up 12a (hereinafter also referred to as "right-kick-up rear portion 32").

The rear cross member 15 is disposed in the width direction of the vehicle between the rear portions 31 and 32 of the left and right kick-ups.

Figure 2:
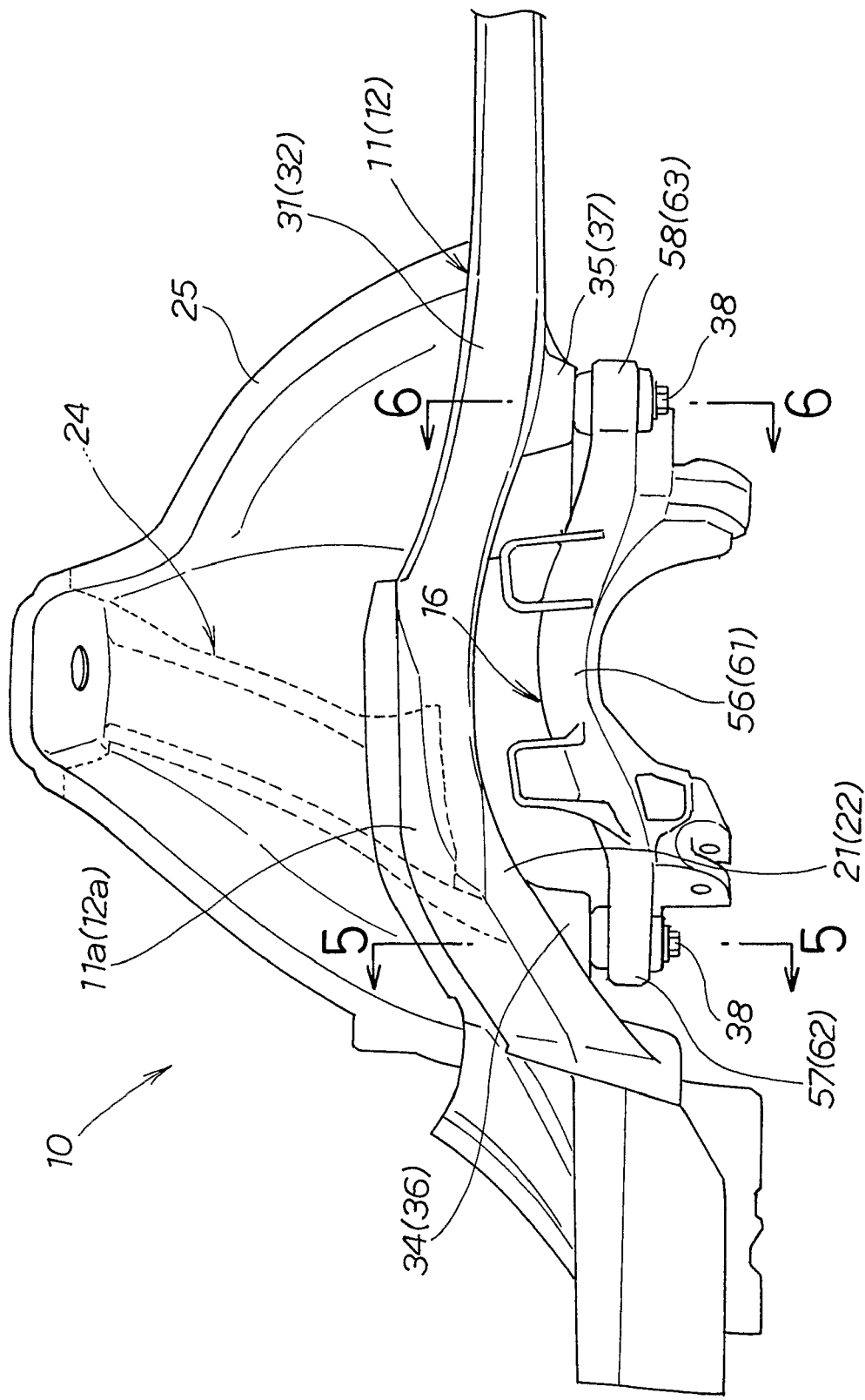
FIG. 2 is a side view of the rear vehicle body structure of the present invention.

FIG. 2 is a side view of the rear vehicle body structure of the present invention.

The left rear side frame 11 has a left front connecting portion 34 near the front end of the left-kick-up front portion 21 and a left rear connecting portion 35 on the left-kick-up rear portion 31.

Similarly, the right rear side frame 12 has a right front connecting portion 36 (see also FIG. 4) near the front end of the right-kick-up front portion 22 and a right rear connecting portion 37 (see also FIG. 4) on the right-kick-up rear portion 32.

The sub-frame 16 is connected to the left and right front connecting portions 34 and 36 and left and right front connecting portions 35 and 37 by means of a plurality of bolts 38.

Figure 3:
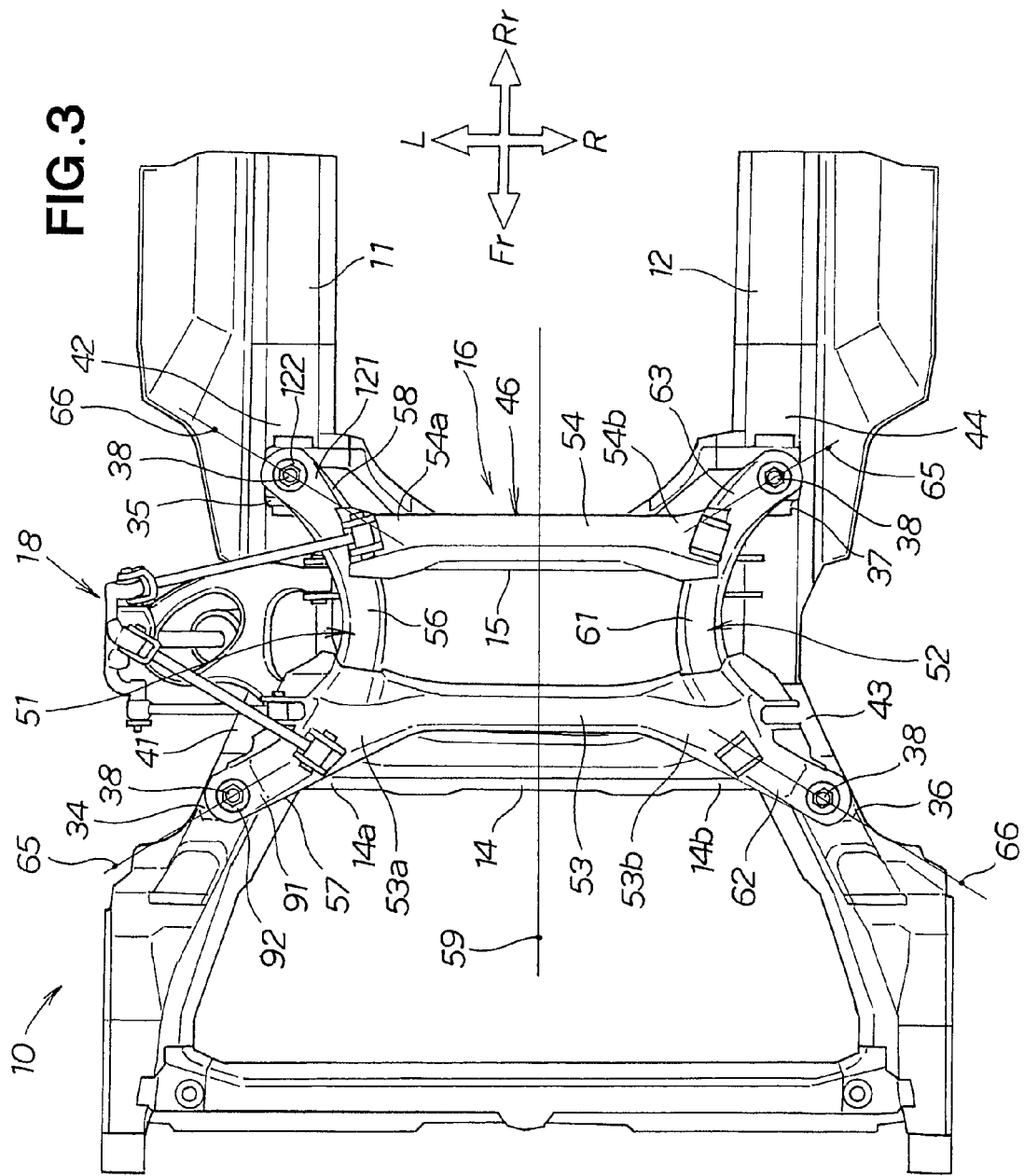
FIG. 3 is a bottom view of the rear vehicle body structure of the present invention.

FIG. 3 is a bottom view of the rear vehicle body structure of the present invention, and FIG. 4 is a bottom view of the rear vehicle body structure with the sub-frame 16 detached from the rear vehicle body structure.

The left front connecting portion 34 is located slightly forward of, i.e., near, a left front joint section 41 where the left rear side frame 11 and the left end portion 14a of the front cross member 14 are joined together. Because the left front joint section 41 is where the left rear side frame 11 and the left end portion 14a of the front cross member 14 are joined together, it has a great rigidity. With the left front connecting portion 34 provided near the left front joint section 41, the left front connecting portion 34 can have an increased rigidity.

The right front connecting portion 36 is located slightly forward of, i.e., near, a right front joint section 43 where the right rear side frame 12 and the right end portion 14b of the front cross member 14 are joined together. Because the right front joint section 43 is where the right rear side frame 12 and the right end portion 14b of the front cross member 14 are joined together, it has a great rigidity. With the right front connecting portion 36 provided near the right front joint section 43, the right front connecting portion 36 can have an increased rigidity.

The left rear connecting portion 35 is provided on a left rear joint section 42 where the left rear side frame 11 and the left end portion 15a of the rear cross member 15 are joined together. Because the left rear joint section 42 is where the left rear side frame 11 and the left end portion 15a of the rear cross member 15 are joined together, it has a great rigidity. With the left rear connecting portion 35 provided near the left rear joint section 42, the left rear connecting portion 35 can have an increased rigidity.

The right rear connecting portion 37 is provided on a right rear joint section 44 where the right rear side frame 12 and the right end portion 15b of the rear cross member 15 are joined together. Because the right rear joint section 44 is where the right rear side frame 12 and the right end portion 15b of the right cross member 15 are joined together, it has a great rigidity. With the right rear connecting portion 37 provided near the right rear joint section 44, the right rear connecting portion 37 can have an increased rigidity.

The sub-frame 16 includes a left sub side member 51 of a substantially U shape, a right sub side member 52 of a substantially U shape, a front sub cross member 53 extending linearly, and a rear sub cross member 54 extending linearly. The left and right sub side members 51 and 52 each have a generally U shape, projecting toward each other.

The left sub side member 51 includes a left middle portion 56 curved to project toward the longitudinal centerline 59 of the vehicle body, a left front extension portion 57 slanting in a forward and outward direction of the vehicle body from the front end of the left middle portion 56, and a left rear extension portion 58 slanting in a rearward and outward direction of the vehicle body from the rear end of the left middle portion 56. Namely, the left sub side member 51 is formed into a substantially U shape such that the whole of the side member 51 projects inwardly toward the longitudinal centerline 59 of the vehicle body.

The left sub side member 51, which is located beneath the left rear side frame 11, connected at the left front extension portion 57 to the left front connecting portion 34 by means of the bolt 38 and connected at the left rear extension portion 58 to the left rear connecting portion 35 by means of the bolt 38.

The right sub side member 52 includes a right middle portion 61 curved to project toward the longitudinal centerline 59 of the vehicle body, a right front extension portion 62 slanting in a forward and outward direction of the vehicle body from the front end of the right middle portion 61, and a right rear extension portion 63 slanting in a rearward and outward direction of the vehicle body from the rear end of the right middle portion 61. Namely, the right sub side member 52 is formed into a substantially U shape such that the whole of the side member 52 projects inwardly toward the longitudinal centerline 59 of the vehicle body.

The right sub side member 52, which is located beneath the right rear side frame 12, connected at the right front extension portion 62 to the right front connecting portion 36 by means of the bolt 38 and connected at the right rear extension portion 63 to the right rear connecting portion 37 by means of the bolt 38.

The front sub cross member 53 has a left end portion 53a fixedly joined to a region of the left sub side member 51 near the left front extension portion 57, and a right end portion 53b fixedly joined to a region of the right sub side member 52 near the right front extension portion 62.

Namely, the front sub cross member 53 spans between the region of the left sub side member 51 near the left front extension portion 57 and the region of the right sub side member 52 near the right front extension portion 62. The front sub cross member 53 is a linear member extending in the width direction of the vehicle.

The rear sub cross member 54 has a left end portion 54a fixedly joined to a region of the left sub side member 51 near the left rear extension portion 58, and a right end portion 54b fixedly joined to a region of the right sub side member 52 near the right rear extension portion 63.

Namely, the rear sub cross member 54 spans between the region of the left sub side member 51 near the left rear extension portion 58 and the region of the right sub side member 52 near the right rear extension portion 63. The rear sub cross member 54 is also a linear member extending in the width direction of the vehicle.

Thus, the left middle portion 56 of the left sub side member 51, right middle portion 61 of the right sub side member 52, front sub cross member 53 and rear sub cross member 54 together constitute a generally rectangular framework 46.

The left and right sub side members 51 and 52 each have a generally U shape projecting toward each other, so that a distance L1 between the left and right sub side members 51 and 52 can be made considerably small in the left and right middle portions 56 and 61.

The front sub cross member 53 spans between the region of the left sub side member 51 near the left front extension portion 57 and the region of the right sub side member 52 near the right front extension portion 62, and the rear sub cross member 54 spans between the region of the left sub side member 51 near the left rear extension portion 58 and the region of the right sub side member 52 near the right rear extension portion 63. Namely, the front sub cross member 53 spans between near-front-end regions, closer to the middle portions than the front ends, of the left and right sub side members 51 and 52, and the rear sub cross member 54 spans between near-rear-end regions, closer to the middle portions than the rear ends, of the left and right sub side members 51 and 52. Thus, a distance L2 between the front and rear sub cross members 53 and 54 can be made considerably small.

With the distance L1 between the left and right sub side members 51 and 52 and distance L2 between the front and rear sub cross members 53 and 54 limited to small distances as noted above, the framework 46 of the sub-frame 16 can be made compact in size. With the framework 46 of the sub-frame 16 constructed compactly, the sub-frame 16 can have a sufficient rigidity.

The left and right sub side members 51 and 52 each have a substantially U shape. Thus, the left front extension portion 57 of the left sub side member 51 and right rear extension portion 63 of the right sub side member 52 extend on a diagonal line 65 of the framework 46. The left front extension portion 57 and right rear extension portion 63 are disposed at about 45° to the front-rear direction and width direction of the vehicle body.

Similarly, the right front extension portion 62 of the right sub side member 52 and left rear extension portion 58 of the left sub side member 51 extend on a diagonal line 66 of the framework 46. The left front extension portion 57 and right rear extension portion 63 are disposed at about 45° to the front-rear direction and width direction of the vehicle body.

Namely, the left front extension portion 57 and the right rear extension portion 63 extend collinearly with each other, and the left rear extension portion 58 and the right front extension portion 62 extend collinearly with each other. Further, the extension portions 57, 58, 62 and 63 are each disposed at about 45° to the front-rear direction and width direction of the vehicle body. In this way, a load applied to the sub-frame 16 in the front-rear direction and width direction of the vehicle body can be efficiently transmitted, via the extension portions 57, 58, 62 and 63, to the left front, left rear, right front and right rear connecting portions 34, 35, 36 and 37.

Figure 5:
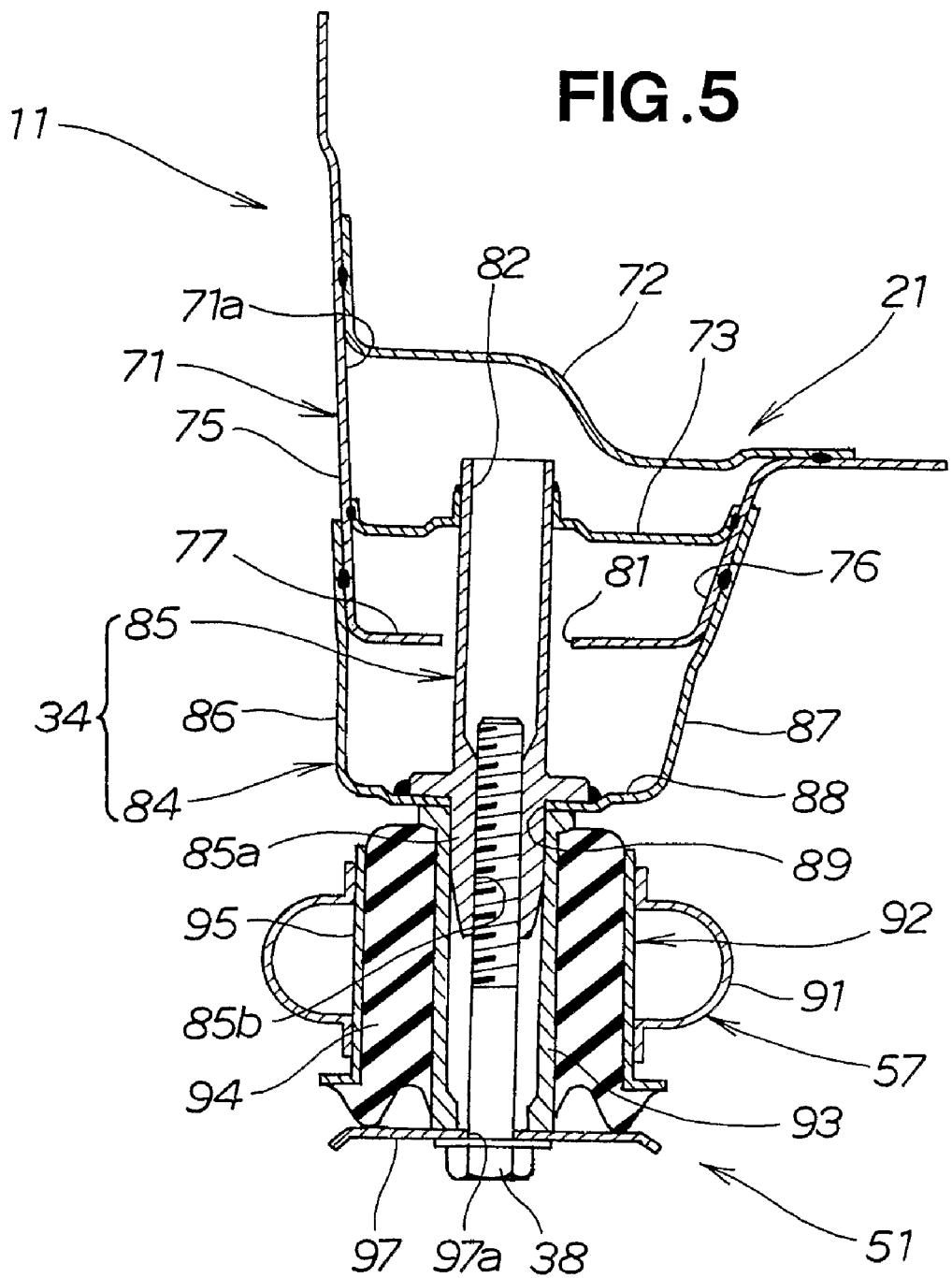
FIG. 5 is a sectional view taken along line 5-5 of FIG. 2.

FIG. 5 is a sectional view taken along the 5-5 line of FIG. 2. In the left-kick-up front portion 21 of the left rear side frame 11, a rear lower frame 71 is formed into a concave sectional shape, an opening 81a of the rear lower frame 71 is closed with a rear upper frame 72, and the rear lower frame 71 is reinforced by an reinforcing plate 73.

The concave sectional shape of the rear lower frame 71, which is a member extending in the front-rear direction of the vehicle body, is defined by outer and inner walls 75 and 76 and bottom surface 77. Front through-hole 81 is formed in the bottom surface 77. The reinforcing plate 73 has a front mounting hole 82 formed concentrically with the through-hole 81.

The left front connecting portion 34 is provided in the left-kick-up front portion 21 of the left rear side frame 11. The left front connecting portion 34 has a front mounting bracket 84 fixed to the left-kick-up front portion 21, and a front mounting nut 85 mounted on the front mounting bracket 84.

The front mounting bracket 84 has a concave sectional shape defined by outer and inner walls 86 and 87 and bottom surface 88. The outer wall 86 of the front mounting bracket 84 is spot-welded to the outer wall 75 of the rear lower frame 71, and the inner wall 87 of the front mounting bracket 84 is spot-welded to the inner wall 76 of the rear lower frame 71. The bottom surface 88 has a front supporting hole 89 that is formed concentrically with the front mounting hole 82.

The front mounting nut 85 is inserted in the front through-hole 81, front supporting hole 89 and front mounting hole 82, and it is welded to the reinforcing plate 73 and bottom plate 88. The front mounting nut 85 is a hollow member and has an internal thread 85b formed in a lower portion 85a thereof, and the lower portion 85a has a lower region projecting downward beyond the front supporting hole 89.

The left front extension portion 57 of the left sub side member 51 is fastened to the left front connecting portion 34 by means of the bolt 38. The left front extension portion 57 includes a front extension bar 91 extending from a left front corner of the rectangular framework 46 of FIG. 3 along the diagonal line 65, and a front mounting portion 92 provided on a front end portion of the front extension bar 91. The front mounting portion 92 includes a hollow collar 93, a rubber member 94 provided on the outer peripheral surface of the collar 93, and a cylindrical shell 95 provided on the outer peripheral surface of the rubber member 94. The cylindrical shell 95 is attached to a front end portion of the front extension bar 91.

The hollow collar 93 is fitted on the lower region of the lower portion 85a of the front mounting nut 85. Plate 97 is abutted against the lower end of the front mounting portion 92, the bolt 38 is inserted in the collar 93 from below through a hole 97a of the plate 97, and an external thread portion of the bolt 38 is screwed on the internal thread 85b of the front mounting nut 85. In this manner, the front mounting portion 92, i.e. left front extension portion 57, is connected to the left front connecting portion 34 by means of the bolt 38.

With the left front connecting portion 34 provided near the left front joint section 41 as shown in FIG. 4, it is possible to enhance the rigidity of the left front connecting portion 34. Thus, the left front extension portion 57 is securely connected to the rear side frame 11 via the left front connecting portion 34. In this way, a load applied to the left front extension portion 57 can be efficiently transmitted to the left rear side frame 11 and front cross member 14.

Figure 6:
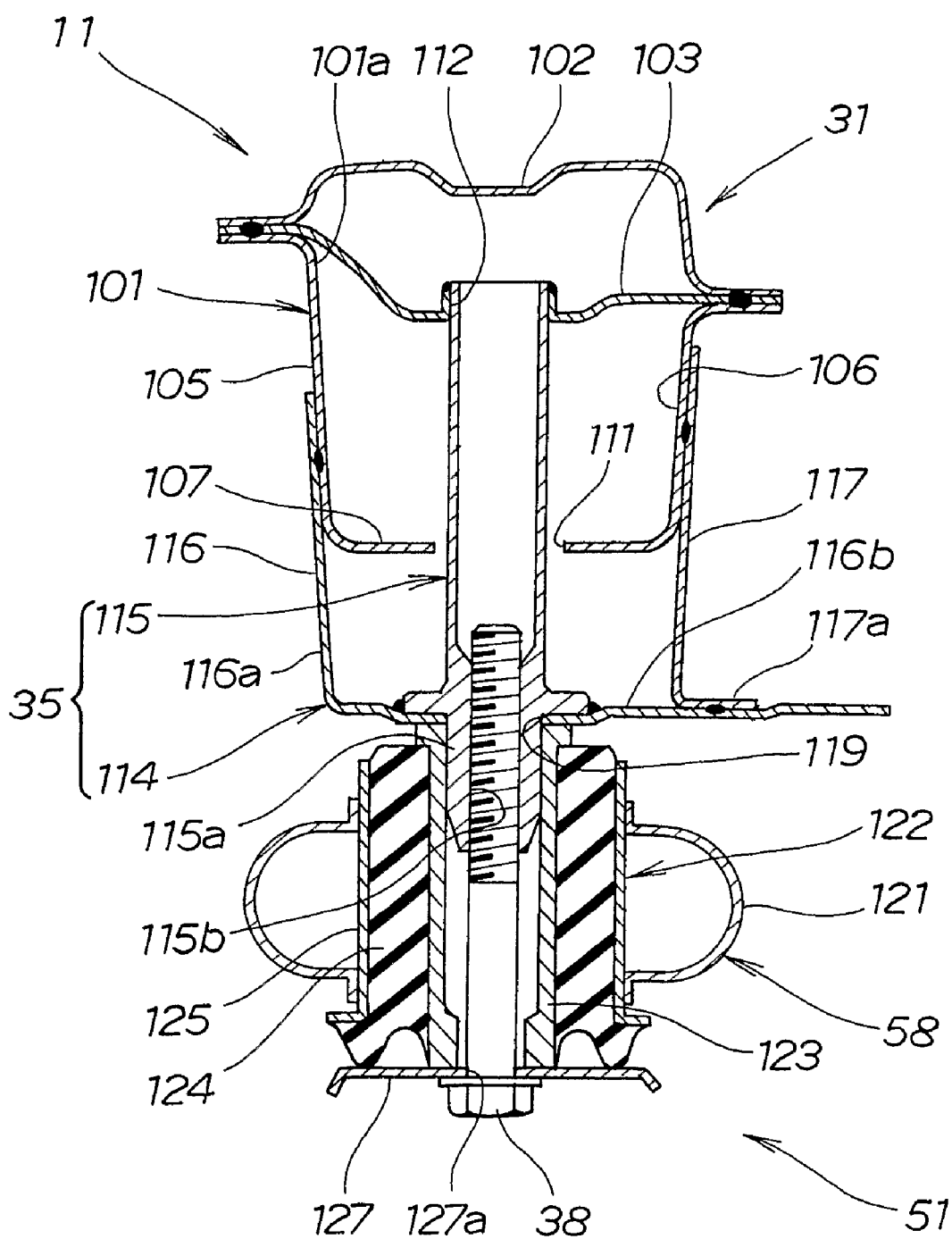
FIG. 6 is a sectional view taken along line 6-6 of FIG. 2.

FIG. 6 is a sectional view taken along the 6-6 line of FIG. 2. In the left-kick-up rear portion 31 of the left rear side frame 11, a rear lower frame 101 is formed into a concave sectional shape, an opening 101a of the rear lower frame 101 is closed with a rear upper frame 102 and reinforcing plate 103. These rear lower frame 101, rear upper frame 102 and reinforcing plate 103 of the left-kick-up rear portion 31 are similar in construction and operation to the rear lower frame 71, rear upper frame 72 and reinforcing plate 73 of the left-kick-up front portion 21 described above in relation to FIG. 5.

The concave sectional shape of the rear lower frame 101, which is a member extending in the front-rear direction of the vehicle body, is defined by outer and inner walls 105 and 106 and bottom surface 107. Rear through-hole 111 is formed in the bottom surface 107. The reinforcing plate 103 has a rear mounting hole 112 formed concentrically with the rear through-hole 111.

The left rear connecting portion 35 is provided in the left-kick-up rear portion 31 of the left rear side frame 11. The left rear connecting portion 35 has a rear mounting bracket 114 fixed to the left-kick-up rear portion 31, and a rear mounting nut 115 mounted on the rear mounting bracket 114.

The rear mounting bracket 114 includes outer and inner plates 116 and 117. The outer plate 116 has a substantially L shape defined by an outer wall 116a and bottom surface 116b. The bottom surface 116b is spot-welded to a bent portion 117a of the inner plate 117. Thus, the rear mounting bracket 114 has a concave sectional shape defined by outer and inner plates 116 and 117.

The outer wall 116a of the outer plate 116 is spot-welded to the outer wall 105 of the rear lower frame 101, and the inner wall 117 is spot-welded to the inner wall 106 of the rear lower frame 101. The bottom surface 116b has a rear supporting hole 119 that is formed concentrically with the rear mounting hole 112.

The rear mounting nut 115 is inserted in the rear through-hole 111 and rear supporting hole 119, and it is welded to the reinforcing plate 103 and bottom surface 116b. The rear mounting nut 115 is a hollow member similar to the front mounting nut 85 and has an internal thread 115b formed in a lower portion 115a thereof, and the lower portion 115a has a lower region projecting downward beyond the rear supporting hole 119.

The left rear extension portion 58 of the left sub side member 51 is fastened to the left rear connecting portion 35 by means of the bolt 38. The left rear extension portion 58 includes a rear extension bar 121 extending along the diagonal line 66 from a left rear corner portion of the framework 46 shown in FIG. 3, and a rear mounting portion 122 provided on a front end portion of the rear extension bar 121. The rear mounting portion 122 includes a hollow collar 123, a rubber member 124 provided on the outer peripheral surface of the collar 123, and a cylindrical shell 125 provided on the outer peripheral surface of the rubber member 124. The cylindrical shell 125 is attached to a front end portion of the rear extension bar 121.

The hollow collar 123 is fitted on the lower region of the lower portion 115a of the rear mounting nut 115. Plate 127 is abutted against the lower end of the rear mounting portion 122, the bolt 38 is inserted in the collar 123 from below through a hole 127a of the plate 127, and an external thread portion of the bolt 38 is engaged on the internal thread 115b of the rear mounting nut 115. In this manner, the rear mounting portion 122, i.e. left rear extension portion 58, is connected to the left rear connecting portion 35 by means of the bolt 38.

With the left rear connecting portion 35 provided near the left rear joint section 42 as shown in FIG. 4, it is possible to enhance the rigidity of the left rear connecting portion 35. Thus, the left rear extension portion 58 can be securely connected to the rear side frame 11 via the left rear connecting portion 35. In this way, a load applied to the left rear extension portion 58 can be efficiently transmitted to the rear side frame 11 and rear cross member 15.

The right front connecting portion 36, right rear connecting portion 37, right front extension portion 62, right rear extension portion 63, etc. are similar in construction and operation to, and disposed in left-right symmetric relation to, the left front connecting portion 34, left rear connecting portion 35, left front extension portion 57, left rear extension portion 58, etc. described above in relation to FIGS. 5 and 6. Thus, the right front connecting portion 36, right rear connecting portion 37, right front extension portion 37, right rear extension portion 63, etc. will not be described in detail here.

Stated simply, in each of the areas where the opposite end portions of the front and rear cross members 14 and 15 overlap with the left and right rear side frames 11 and 12, the mounting nut 85 or 115 is inserted through overlapping wall portions of the cross member and the side frame to fasten together the cross member and the side frame in conjunction with the bolt 38.

With reference to FIGS. 7 and 8, the following paragraphs describe example behavior of the rear vehicle body structure when a load applied in the front-rear direction and width direction of the vehicle body during travel of the vehicle acts on the sub-frame 16 via the left and right rear suspensions 18 and 19 (the right suspension 19 is not shown in the figures).

Figure 7A:
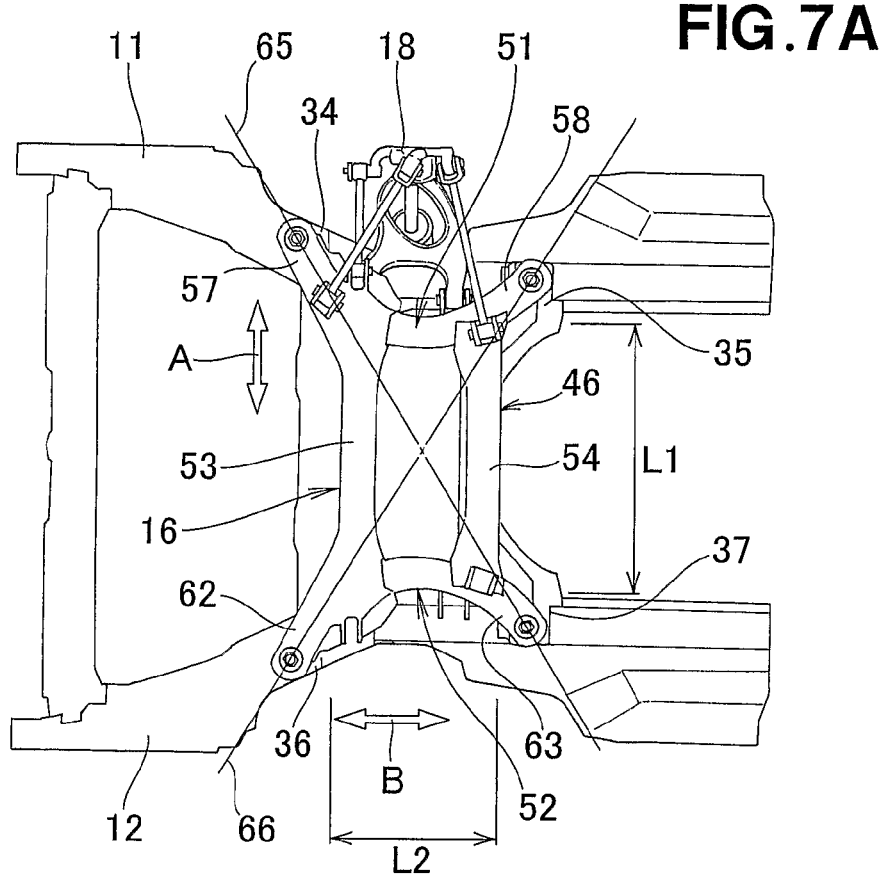
FIGS. 7A and 7B are view explanatory of example behavior of the rear vehicle body structure when a load acts on the sub-frame via suspensions.

In FIG. 7A, a load applied in the width direction of the vehicle body acts on the sub-frame 16 as indicated by arrow A and a load applied in the front-rear direction of the vehicle body acts on the sub-frame 16 as indicated by arrow B, via the left and right rear suspensions 18 and 19 (the right suspension 19 is not shown). In the instant embodiment, the sub-frame 16 can retain a sufficient rigidity by reducing the distance L1 between the left and right sub side members 51 and 52 and the distance L2 between the front and rear sub cross members 53 and 54 to thereby reduce the size of the framework 46. Consequently, the load acting on the sub-frame 16 can be sufficiently borne by the sub-frame 16.

The load acting on the sub-frame 16 is transmitted not only to the left front connecting portion 34 by way of the left front extension portion 57 but also to the left rear connecting portion 35 by way of the left rear extension portion 58. Further, the load applied to the sub-frame 16 is transmitted not only to the right front connecting portion 36 by way of the right front extension portion 62 but also to the right rear connecting portion 37 by way of the right rear extension portion 63.

Because the extension portions 57, 58, 62 and 63 are each disposed at about 45° to the front-rear direction and width direction of the vehicle body, the load applied to the sub-frame 16 in the arrow A direction and arrow B direction can be efficiently transmitted, by way of the extension portions 57, 58, 62 and 63, to the left front, left rear, right front and right rear connecting portions 34, 35, 36 and 37.

Figure 7B:
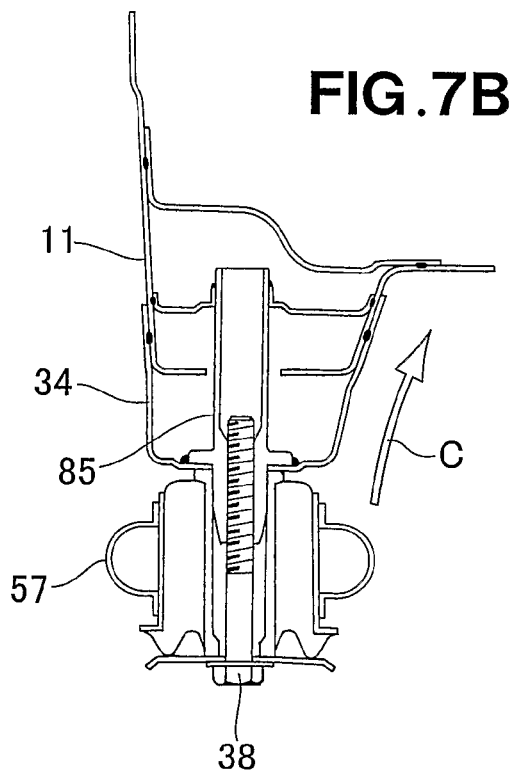

In FIG. 7B, the left front connecting portion 34 can have a sufficient rigidity by being provided near the left front joint section 41 (see FIG. 4). Thus, the load transmitted from the left front extension portion 57 to the left front connecting portion 34 can be efficiently transmitted toward the left rear side frame 11 as indicated by arrow C.

Figure 8A:
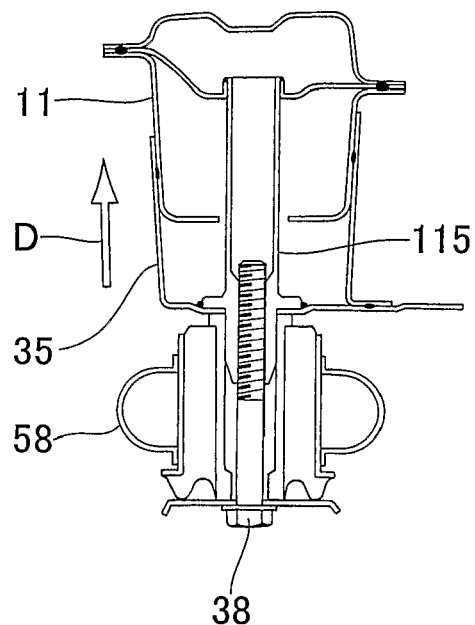
FIGS. 8A and 8B are views explanatory of example behavior of the rear vehicle body structure when a load is transmitted to front and rear cross members.
Figure 8B:
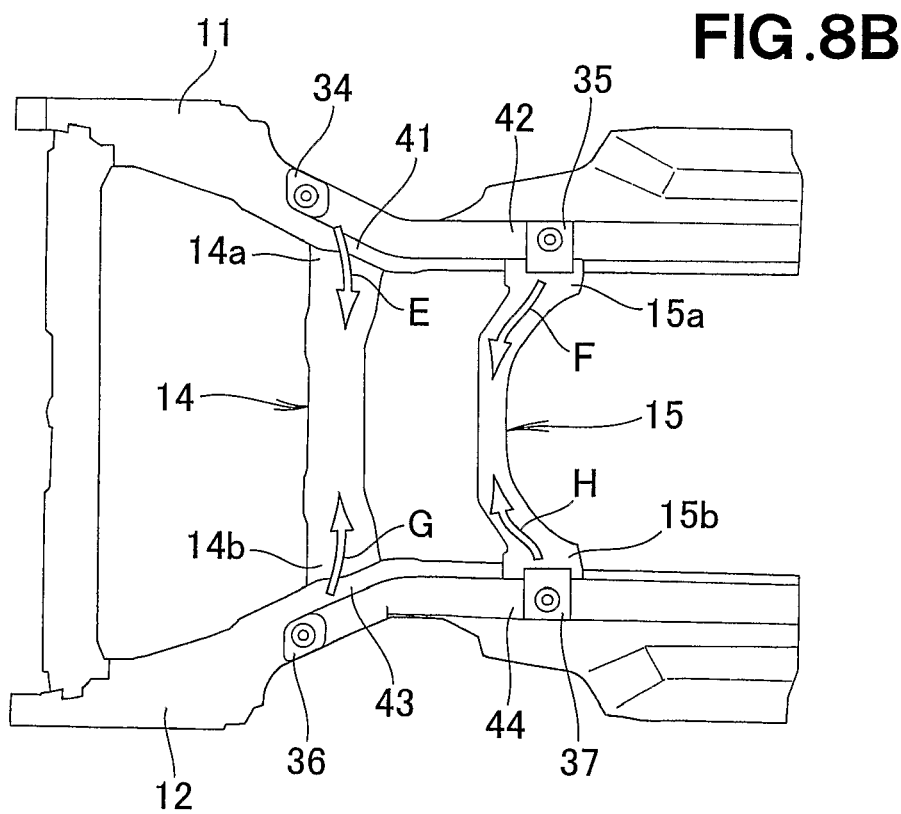

FIGS. 8A and 8B show example behavior of the rear vehicle body structure when a load is transmitted to the front and rear cross members in the instant embodiment.

In FIG. 8A, the left rear connecting portion 35 can have a sufficient rigidity by being provided near the left rear joint section 42 (see FIG. 4). Thus, a load transmitted from the left rear extension portion 58 to the left rear connecting portion 35 can be efficiently transmitted toward the left rear side frame 11 as indicated by arrow D.

The left front connecting portion 34 (see FIG. 7B) and left rear connecting portion 35 are similar in construction and operation to, and disposed in left-right symmetric relation to, the right front connecting portion 36 and right rear connecting portion 37 shown in FIG. 4. Thus, a load transmitted from the right front extension portion 62 of FIG. 3 to the right front connecting portion 37 can be efficiently transmitted toward the right rear side frame 12. Similarly, a load transmitted from the right rear extension portion 63 to the right rear connecting portion 37 can be efficiently transmitted toward the right rear side frame 12.

As shown in FIG. 8B, the left front joint section 41 is provided near the left front connecting portion 34. Thus, the load transmitted to the left rear side frame 11 can be efficiently transmitted via the left end portion 14a to the front cross member 14 by way of the left front joint section 41, as indicated by arrow E.

Further, the left rear joint section 42 is provided on the left rear connecting portion 35. Thus, the load transmitted to the left rear side frame 11 can be efficiently transmitted via the left end portion 15a to the rear cross member 15 by way of the left rear joint section 42, as indicated by arrow F.

Similarly, the load transmitted from the right front connecting portion 36 to the left rear side frame 12 can be efficiently transmitted via the right end portion 14b to the front cross member 14 by way of the right front joint section 43, as indicated by arrow G.

Further, the load transmitted from the right rear connecting portion 37 to the right rear side frame 12 can be efficiently transmitted via the right end portion 15b to the rear cross member 15 by way of the right rear joint section 44, as indicated by arrow H.

In the aforementioned manner, if a load has been transmitted to the sub-frame 16 via the left and right rear suspensions 18 and 19 during travel of the vehicle, the transmitted load can be efficiently dispersed to and absorbed by the left and right rear side frames 11 and 12 and front and rear cross members 14 and 15.

Figure 9:
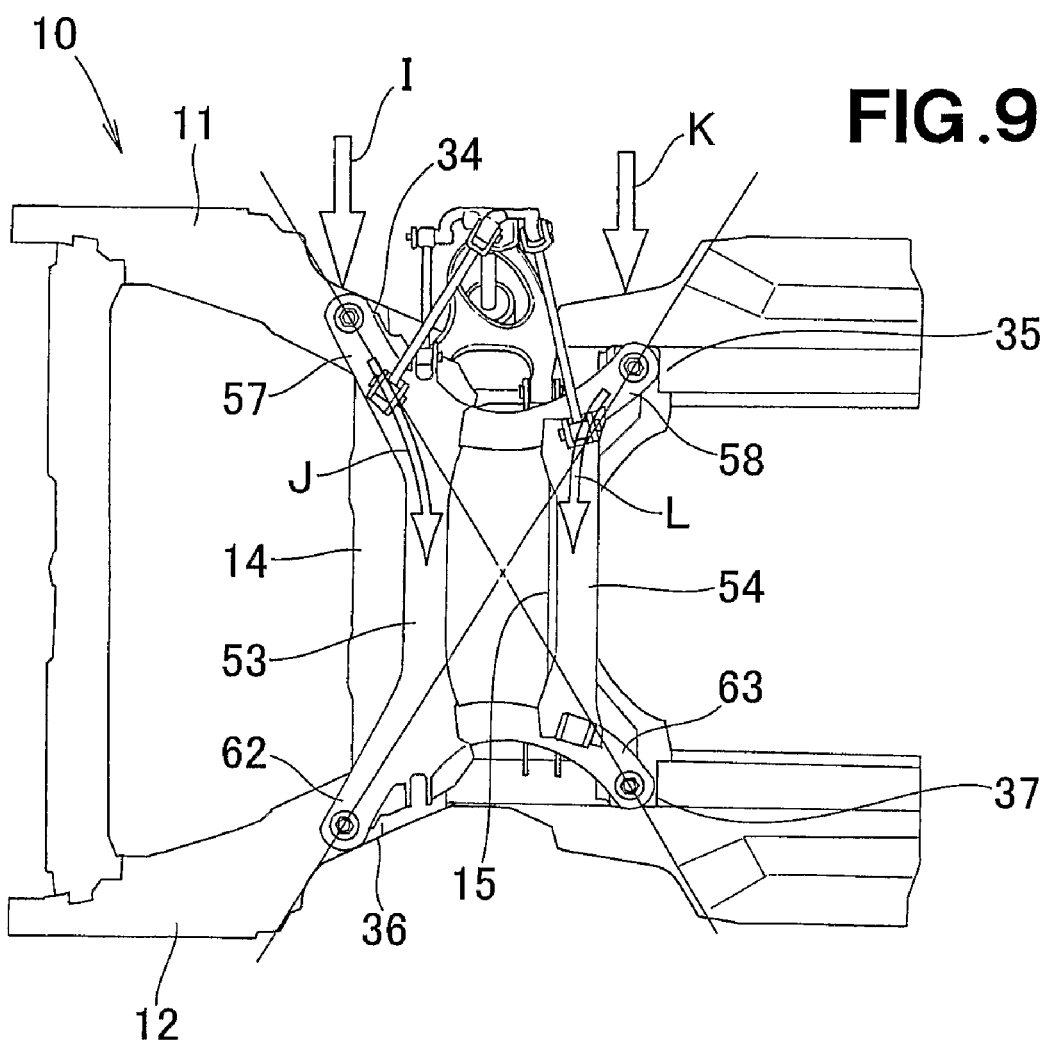
FIG. 9 is a view explanatory of example behavior of the rear vehicle body structure when an impact acts on a left rear side frame.

Next, with reference to FIG. 9, a description will be given about example behavior of the rear vehicle body structure of the invention when an impact has acted on the left rear side frame 11 of the structure 10.

When an impact has acted on the left rear side frame 11, a load acts on the left front connecting portion 34 as indicated by arrow I. In this case, the load applied to the left front connecting portion 34 is transmitted not only to the front cross member 14 but also to a front end portion of the left front extension portion 57.

Because the left front extension portion 57 is disposed at about 45° to the front-rear direction and width direction of the vehicle body, the load transmitted to the front end portion of the extension portion 57 can be efficiently transmitted to the sub cross member 53 as indicated by arrow J. Thus, the load applied to the left front connecting portion 34 can be efficiently absorbed by the front cross member 14 and front sub cross member 53.

Similarly, in the left rear side frame 11 of the rear vehicle body structure 10, a load acts on the left rear connecting portion 35 as indicated by arrow K. In this case, the load applied to the left rear connecting portion 35 is transmitted not only to the rear cross member 15 but also to a front end portion of the left rear extension portion 58.

Because the left rear extension portion 58 is disposed at about 45° to the front-rear direction and width direction of the vehicle body, the load transmitted to the front end portion of the extension portion 58 can be efficiently transmitted to the rear sub cross member 54 as indicated by arrow L. Thus, the load applied to the left rear connecting portion 35 can be efficiently absorbed by the rear cross member 15 and rear sub cross member 54.

When a load has acted on the right front connecting portion 36 in the right rear side frame 12 of the rear vehicle body structure 10, the load can be efficiently absorbed by the front cross member 14 and front sub cross member 53. Further, when a load has acted on the right rear connecting portion 37 in the right rear side frame 12 of the rear vehicle body structure 10, the load can be efficiently absorbed by the rear cross member 15 and rear sub cross member 54.

Whereas the preferred embodiment has been described above in relation to the case where the middle portions 56 and 61 of the left and right sub side members 51 and 52 each have a curved shape, the present invention is not so limited; for example, the middle portions 56 and 61 may be of a straight shape. In this case too, the left and right side members 51 and 52 are each formed into a substantially U shape.

INDUSTRIAL APPLICABILITY

The rear vehicle body structure of the present invention is suited for use in automotive vehicles having cross members spanning between rear side frames and a sub-frame provided beneath the cross members.

The invention claimed is:

1. A rear vehicle body structure comprising:
   left and right rear side frames (11, 12) provided in a rear vehicle body section;
   front and rear cross members (14, 15) spanning between the left and right rear side frames (11, 12) with a predetermined interval between the cross members; and
   a sub-frame (16) disposed beneath the front and rear cross members and having rear suspensions (18, 19) provided thereon,
   said sub-frame including:
      left and right sub side members (51, 52) each having a substantially U shape such that said left and right sub side members project inwardly toward a centerline of the vehicle body;
      a front sub cross member (53) spanning between respective near-front-end regions of said left and right sub side members; and
      a rear sub cross member (54) spanning between respective near-rear-end regions of said left and right sub side members,
   wherein the left and right sub side members (51, 52) and the front and rear sub cross members (53, 54) together constitute a framework (46) of a substantially rectangular shape,
   said left sub side member (51) of the substantially U shape includes a left rear extension portion (58) extending from the framework toward a rear of the vehicle body, the left rear extension portion being connected to a joint section (42) where the rear cross member (15) and the left rear side frame (11) are joined together, and
   said right sub side member (52) of the substantially U shape includes a right rear extension (63) portion extending from the framework toward the rear of the vehicle body, the right rear extension portion being connected to a joint section (44) where the rear cross member (15) and the right rear side frame (12) are joined together.

2. The rear vehicle body structure of claim 1, wherein said left sub side member (51) of the substantially U shape further includes a left front extension portion (57) extending from the framework toward a front of the vehicle body, the left front extension portion being connected to a joint section (41) where the front cross member (14) and the left rear side frame (11) are joined together, and said right sub side member (52) of the substantially U shape further includes a right front extension portion (62) extending from the framework toward the front of the vehicle body, the right front extension portion being connected to a joint section (43) where the front cross member (14) and the right rear side frame (12) are joined together.

3. The rear vehicle body structure of claim 2, wherein the left front extension portion (57) and the right rear extension portion (63) extend collinearly with each other, and the left rear extension portion (58) and the right front extension portion (62) extend collinearly with each other.

4. The rear vehicle body structure of claim 1, wherein the front and rear cross members (14, 15) are each connected at opposite end portions thereof with the left and right rear side frames (11, 12) in overlapping relation to the left and right rear side frames (11, 12), and, in each of areas where the opposite end portions of the front and rear cross members overlap with the left and right rear side frames, a nut (38) is inserted through overlapping wall portions of the cross member and the side frame to fasten together the cross member and the rear side frame in conjunction with a bolt.

* * * * *